(12) United States Patent
Cases et al.

(10) Patent No.: US 8,572,004 B2
(45) Date of Patent: Oct. 29, 2013

(54) SPACE SOLUTION SEARCH

(75) Inventors: Moises Cases, Austin, TX (US); Jinwoo Choi, Austin, TX (US); Bhyrav M. Mutnury, Austin, TX (US); Navraj Singh, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 12/649,064

(22) Filed: Dec. 29, 2009

(65) Prior Publication Data

US 2011/0161055 A1    Jun. 30, 2011

(51) Int. Cl.
  G06E 1/00    (2006.01)
  G06E 3/00    (2006.01)
  G06F 15/00   (2006.01)
  G06G 7/00    (2006.01)
  G06N 99/00   (2010.01)

(52) U.S. Cl.
  USPC .............................. 706/10; 716/102; 700/298

(58) Field of Classification Search
  None
  See application file for complete search history.

(56) References Cited

U.S. PATENT DOCUMENTS

| | | | |
|---|---|---|---|
| 6,154,801 A | 11/2000 | Lowe et al. | |
| 6,216,252 B1* | 4/2001 | Dangelo et al. | 716/102 |
| 6,298,452 B1 | 10/2001 | Hill | |
| 6,470,482 B1 | 10/2002 | Rostoker et al. | |
| 6,845,491 B2 | 1/2005 | Miller et al. | |
| 7,072,814 B1 | 7/2006 | Stoica | |
| 7,085,702 B1 | 8/2006 | Hwang et al. | |
| 7,130,783 B1 | 10/2006 | Harer et al. | |
| 2004/0064296 A1 | 4/2004 | Saxena et al. | |
| 2009/0198386 A1* | 8/2009 | Kim et al. | 700/298 |

FOREIGN PATENT DOCUMENTS

| | | |
|---|---|---|
| JP | 2006285860 | 10/2006 |
| WO | 2004114166 | 12/2004 |

OTHER PUBLICATIONS

"Worst-case Analysis and Optimization of VLSI Circuit Performances" Abhijit Dharchoudhury, Student Member, IEEE,. and S. M. Kang, Fellow, IEEE Transactions on Computer-Aided Design of Integrated Circuits and Systems, vol. 14, No. 4, Apr. 1995 48 I.*
Abramson, Mark A. , "NOMADm Optimization Software", http://www.gerad.ca/NOMAD/Abramson/nomadm.html (Obtained from the Internet on Nov. 2, 2009) Apr. 2, 2009 , 7 pages.

(Continued)

Primary Examiner — Kakali Chaki
Assistant Examiner — Luis Sitiriche
(74) Attorney, Agent, or Firm — DeLizio Gilliam, PLLC

(57) ABSTRACT

A statistical approach can be used to efficiently supply an initial population that provides a good global description of a design space. The SI based simulation can then find a global best design within a reduced number of simulations. The statistical approach can be utilized to determine a plurality of potential best and worst case designs from a design space. The plurality of potential best and worst case designs from the design space seed or prime a SI based simulation. The best case designs are based on design parameters than can be controlled. The worst case designs are based on design parameters than cannot be controlled due. SI based simulations can then be run on the best case designs with respect to the worst case designs to determine probability of failure of the best case design.

17 Claims, 4 Drawing Sheets

(56) References Cited

OTHER PUBLICATIONS

Beyene, Wendem T., "Application of Artificial Neural Networks to Statistical Analysis and Nonlinear Modeling of High-Speed Interconnect Systems", *IEEE Transactions on Computer-Aided Design of Integrated Circuits and Systems*, vol. 26, Issue 1 http://ieeexplore.ieee.org/stamp/stamp.jsp?tp=&arnumber=4039499&isnumber=4039497 (Obtained from the Internet on Jan. 6, 2010), pp. 166-176.

Beyene, Wendem T., "Statistical and Sensitivity Analysis of Voltage and Timing Budgets of Multi-Gigabit", *DesignCon* 2005.

Cong, Jason et al., "Dynamic weighting Monte Carlo for constrained floorplan designs in mixed signal applications", *Proceedings of 2000 Design Automation Conference (DAC)* http://www.people.fas.harvard.edu/~junliu/TechRept/00folder/cong&etal.pdf (Obtained from the Internet on Oct. 27, 2009) Jan. 2000, 6 pages.

Goh, Chi Keong et al., "Evolving the Tradeoffs between Pareto-Optimality and Robustness in Multi-Objective Evolutionary Algorithms", *Book Chapter, Evolutionary Computation in Dynamic and Uncertain Environments* Apr. 3, 2007.

Guo, Dong et al., "Quasi-Monte Carlo filtering in nonlinear dynamic systems", *IEEE Transactions on Signal Processing*, vol. 54, Issue 6, Part 1 http://ieeexplore.ieee.org/stamp/stamp.jsp?tp=&arnumber=1634806&isnumber=34283 (Obtained from the Internet on Jan. 6, 2010) Jun. 2006, pp. 2087-2098.

Jagarkal, Sudhakar G. et al., "Design optimization and reliability of PWB level electronic package", *The 9th Intersociety Conference on Thermal and Thermomechanical Phenomena in Electronic Systems*, vol. 2 http://ieeexplore.ieee.org/stamp/stamp.jsp?tp=&arnumber=1318306&isnumber=29212 (Obtained from the Internet on Jan. 6, 2010) Jun. 2004, pp. 368-376.

Lai, Yi-Shao et al., "Optimization of Thermomechanical Reliability of Board-level Package-on-Package Stacking Assembly", *IEEE Transactions on Components and Packaging Technologies*, vol. 29, Issue 4 http://ieeexplore.ieee.org/stamp/stamp.jsp?tp=&arnumber=4016227&isnumber=4016207 (Obtained from the Internet on Jan. 6, 2010) Dec. 2006, pp. 864-868.

Le Digabel, Sebastien A., "Nomad user guide version 3.2", http://www.gerad.ca/NOMAD/Downloads/user_guide.pdf (Obtained from the Internet on Oct. 27, 2009) Jul. 8, 2009, pp. 1-45.

Li, Yi et al., "Controller Design of Networked Control System Based on GASA-Abstract", *Journal of System Simulation*, vol. 16, No. 7 (full text of the publication is not available) 2004.

Lu, Xiuzhen et al., "Reliability analysis of embedded chip technique with design of experiment methods", *International Symposium on Electronics Materials and Packaging* http://ieeexplore.ieee.org/stamp/stamp.jsp?tp=&arnumber=1598233&isnumber=33617 (Obtained from the Internet on Jan. 6, 2010) Dec. 2005, pp. 43-49.

Nobile, E. et al., "Geometric Parameterization and Multiobjective Shape Optimization of Convective Periodic Channels", *Numerical Heat Transfer, Part B: Fundamentals*, vol. 50, Issue 5 http://pdfserve.informaworld.com/142799_759220352.pdf (Obtained from the Internet on Nov. 2, 2009) Nov. 2006, 425-453.

Pereira, M. V. et al., "Combining analytical models and Monte Carlo techniques in probablistic power system analysis", *IEEE Transactions on Power Systems*, vol. 7, Issue 1 Feb. 1992, pp. 265-272.

Ridge, Enda et al., "Sequential Experiment Designs for Screening and Tuning Parameters of Stochastic Heuristics", *Workshop on Empirical Methods for the Analysis of Algorithms at the Ninth International Conference on Parallel Problem Solving from Nature (PPSN)* http://www.endaridge.org/publications/conferences/EMAA/EMAA2006_RidgeKudenko.pdf (Obtained from the Internet on Nov. 2, 2009) 2006, 12 pages.

Sun, Tsung-Ying et al., "Optimal UAV flight path planning using skeletonization and Particle Swarm Optimizer", *Evolutionary Computation, 2008. CEC 2008. (IEEE World Congress on Computational Intelligence)* http://ieeexplore.ieee.org/stamp/stamp.jsp?tp=&arnumber=4630946&isnumber=4630767 (Obtained from the Internet on Jan. 6, 2010) Jun. 1-6, 2008, 1183-1188.

Wesley, Caleb et al., "Electrical Design Space Exploration for High Speed Servers", *IEEE, Electronic Components and Technology Conference, 2007. ECTC '07. Proceedings. 57th* http://domino.watson.ibm.com/acas/w3www_acas.nsf/images/projects_0607/$FILE/calebWesley.pdf (Obtained from the Internet on Nov. 2, 2009) May 29-Jun. 1, 2007, 7 pages.

Zhan, Bret A., "Steady state thermal characterization and junction temperature estimation of multi-chip module packages using the response surface method", *The 6th Intersociety Conference on Thermal and Thermomechanical Phenomena in Electronic Systems* May 1998, pp. 76-81.

Zilaro, Patrick et al., "Application of design of experiments methodology to model the effect of multiple parameters on simultaneous switching noise", *Proceedings of 52nd Electronic Components and Technology Conference* http://ieeexplore.ieee.org/stamp/stamp.jsp?tp=&arnumber=1008076&isnumber=21740 (Obtained from the Internet on Jan. 6, 2010) May 2002, pp. 79-85.

"U.S. Appl. No. 12/784,150 Office Action", Jun. 27, 2012, 16 pages.

Singh, N. et al., "Swarm Intelligence for Electrical Design Space Exploration", Electrical Performance of Electronic Packaging, 2007 IEEE, vol., No., pp. 21-24, 29-31 Oct. 2007 URL: http://ieeexplore.ieee.org/stamp/stamp.jsp?tp=&arnumber=4387113&isnumber=4387100 Oct. 2007, pp. 21-24.

"U.S. Appl. No. 12/784,150 Final Office Action", Oct. 18, 2012, 9 pages.

* cited by examiner

SPACE SOLUTION SEARCH

BACKGROUND

Embodiments of the inventive subject matter generally relate to the field of optimization, and, more particularly, to design space solution searches.

Designing electronic systems can be complex due to a multitude of design parameters. Designers define a design space for a particular design based on a plurality of potential values that can be applied to each of the design parameters. The designers then utilize computer aided simulation and modeling tools to analyze the design space so that an optimal set of values can be chosen for the design parameters. Because designs can comprise large numbers of parameters, performing a thorough design space exploration can be computationally expensive. Statistical analysis and simulations employ various techniques, including Monte Carlo methods and Central Composite Design (CCD), to find parameter values for an optimal design.

SUMMARY

Embodiments include a method directed to performing a design of experiment based statistical analysis on a design space defined by a plurality of values for a plurality of parameters. In some embodiments, a plurality of potential best and worst cases for a design can be generated based, at least in part, on said performing the design of experiment based statistical analysis on the design space. A population of a swarm intelligence based simulation of the design can be seeded with the plurality of potential best and worst cases for the design. An overall best case of the design and an overall worst case of the design can be generated based, at least in part, on an output of the swarm intelligence simulation.

Embodiments include a computer program product comprising a computer readable storage medium having computer readable program code. The computer readable program code being configured to perform a design of experiment based statistical analysis on a design space defined by a plurality of values for a plurality of parameters. In some embodiments, a plurality of potential best and worst cases for a design can be generated based, at least in part, on said performing the design of experiment based statistical analysis on the design space. A population of a swarm intelligence based simulation of the design can be seeded with the plurality of potential best and worst cases for the design. An overall best case of the design and an overall worst case of the design can be generated based, at least in part, on an output of the swarm intelligence simulation.

Embodiments include a computer program product comprising a computer readable storage medium having computer readable program code. The computer readable program code being configured to prime a swarm intelligence based simulation with output from a design of experiment based statistical analysis performed with a plurality of values for a plurality of parameters that define a space for a design. In some embodiments, a representation of a recommended design can be generated based, at least in part, on a set of the plurality of values determined by the swarm intelligence based simulation.

Embodiments include an apparatus comprising one or more processing units, a network interface and a simulation unit. In some embodiments, the simulation unit can be operable to perform a design of experiment based statistical analysis on a design space defined by a plurality of values for a plurality of parameters. A plurality of potential best and worst cases for a design can be generated based, at least in part, on said performing the design of experiment based statistical analysis on the design space. A population of a swarm intelligence based simulation of the design can be seeded with the plurality of potential best and worst cases for the design. An overall best case of the design and an overall worst case of the design can be generated based, at least in part, on an output of the swarm intelligence simulation.

BRIEF DESCRIPTION OF THE DRAWINGS

The present embodiments may be better understood, and numerous objects, features, and advantages made apparent to those skilled in the art by referencing the accompanying drawings.

FIG. 3 depicts operations that continue from FIG. 2 for potential worst cases determined from the design of experiment based statistical analysis.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to an electrical design, embodiments are not limited to electrical design simulations and can be applied to find solutions to a variety of problems that employ simulations. In other instances, well-known instruction instances, protocols, structures, and techniques have not been shown in detail in order not to obfuscate the description.

Swarm Intelligence (SI) based simulations can work well to search linear design spaces and a nonlinear design spaces. Examples of swarm intelligence techniques include the particle swarm optimization algorithm, ant colony class of algorithms, and the stochastic diffusion search technique. Although a SI based simulation can perform well for both linear and nonlinear design spaces, a poorly initialized SI based simulation may perform many iterations to converge on a sufficiently valid result. In addition, a SI based simulation focuses heavily on local areas of desired results without sufficient view of overall sensitivity of the design space. A statistical approach (e.g., Central Composite Design (CCD) and orthogonal arrays) can be used to efficiently supply an initial population that provides a good global description of a design space. The SI based simulation can then find a global best design within a reduced number of simulations. The statistical approach can be utilized to determine a plurality of potential best and worst case designs from a design space. The plurality of potential best and worst case designs from the design space seed or prime a SI based simulation. The best case designs are based on design parameters than can be controlled (e.g., length of transmission lines, spacing between transmission lines, driver strengths, etc.). The worst case designs are based on design parameters that cannot be controlled (e.g., impedance of transmission lines, power supply voltage, temperature, etc.). SI based simulations can then be run on the best case designs with respect to the worst case designs to determine the probability of failure of the best case design.

Figure 1:
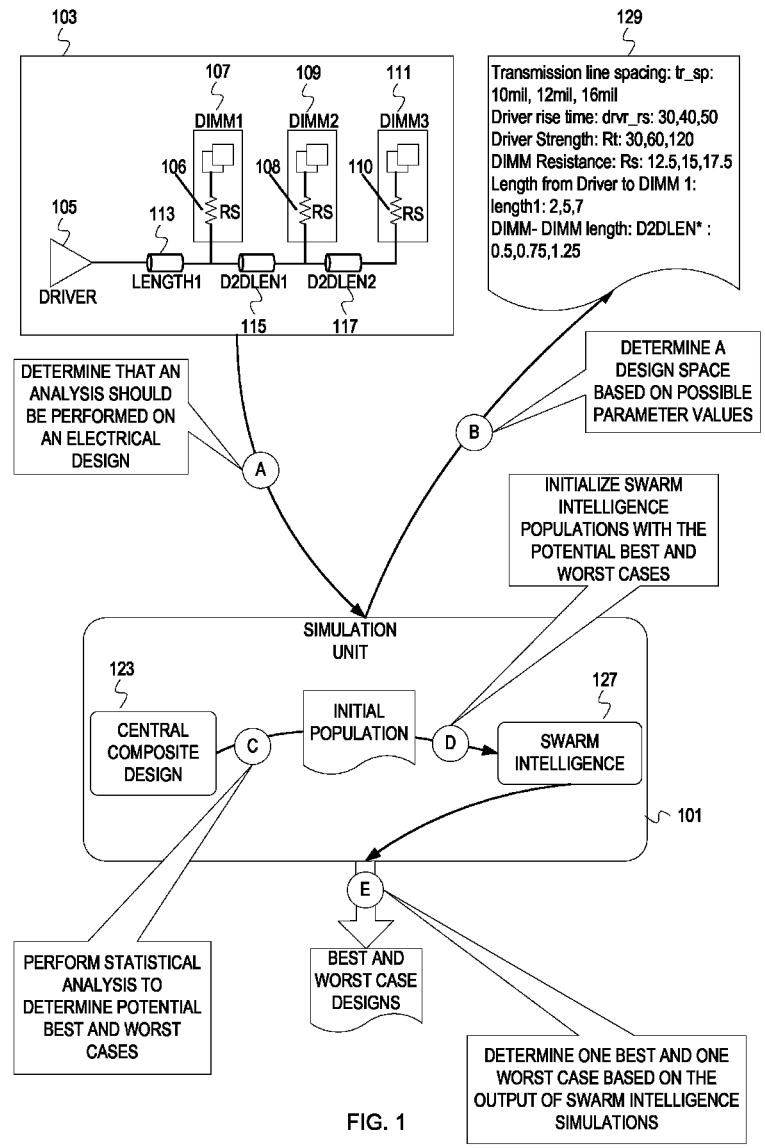
FIG. 1 is an example conceptual diagram of design space search on a memory design a swarm intelligence based simulation seeded with a central composite design statistical analysis.

FIG. 1 is an example conceptual diagram of design space search on a memory design using a swarm intelligence based simulation seeded with a central composite design statistical analysis. An electrical design 103 comprises a driver 105, and three Dual Inline Memory Modules (DIMMs) 107, 109, and 111. A parameter "length1" 113 represents a length of a transmission line between the driver 105 and the DIMM1 107. A parameter "d2dlen1" 115 represents a length of a transmission line between the DIMM1 107 and the DIMM2 109. A "d2dlen2" 117 represents a length of a transmission line between the DIMM2 109 and the DIMM3 111. Parameters "Rs" 106, 108, and 110 represent the resistances of the DIMM1 107, the DIMM2 109, and the DIMM3 111, respectively. Transmission line spacing is not depicted in the electrical design 103.

At stage A, a simulation unit 101 determines that an analysis should be performed on the electrical design 103. For example, the simulation unit 101 detects that a netlist representing the electrical design 103 has been selected. The netlist can comprise a text file that describes the elements of the electrical design 103 (e.g., the driver 105, DIMM1 107, DIMM2 109, DIMM3 111) and the interconnections between the elements (e.g., the transmission lines represented by "length1" 113, "d2dlen1" 115, and "d2dlen2" 117).

At stage B, the simulation unit 101 determines a design space 129 based on possible values for the parameters of the electrical design 103. In this example, the parameters of the electrical design 103 comprise the following: transmission line spacing ("tr_sp"); rise time of the driver 105 ("drvr_rs"); strength of the driver 105 ("rt"); resistance ("rs") 106, 108, 110 of the DIMM1 107, the DIMM2 109, and the DIMM3 111; length1 113, d2dlen1 115, and d2dlen2 117. The potential parameter values 129 comprise three different values for each of the parameters. Values for the "tr_sp" parameter include 10, 12, and 16 milli-inches. Values for the "drvr_rs" parameter include 30, 40, and 50 picoseconds. Values for the "rt" parameter include 30, 60, and 120 ohms. Values for the "rs" 106, 108, 110 parameters include 12.5, 15, and 17.5 ohms. Values for the "length1" 113 parameter include 2, 5, and 7 inches. Values for the "d2dlen1" 115 and the "d2dlen2" 117 parameters include 0.5, 0.75, and 1.25 inches.

At stage C, the simulation unit 101 performs a statistical analysis 119 on the design space 129 to generate an initial population of potential best and worst cases for the electrical design within the design space. In this example, the simulation unit 101 utilizes an analysis module 123 that implements CCD. The analysis module 123 determines the potential best and worst cases based on the design space 129. With the statistical analysis module 123, the simulation unit 101 determines a set of variations to be applied to the parameters ("test cases") to simulate based on the potential values of the design space 129. The simulation unit can generate simulation decks for each test case by applying parameter values of the test case to parameters defined in the netlist. For example, a first test case can apply the values 10 milli-inches, 30 picoseconds, 30 ohms, 12.5 ohms, 12.5 ohms, 12.5 ohms, 2 inches, 0.5 inches, and 0.5 inches to the variables "tr_sp," "drvr_rs," "rt," "rs" 106, "rs" 108, "rs" 110, "lenght1" 113, "d2dlen1" 115, and "d2dlen2" 117, respectively. A second test case can apply the values 12 milli-inches, 40 picoseconds, 60 ohms, 15 ohms, 15 ohms, 15 ohms, 5 inches, 0.75 inches, and 0.75 inches to the variables "tr_sp," "drvr_rs," "rt," "rs" 106, "rs" 108, "rs" 110, "lenght1" 113, "d2dlen1" 115, and "d2dlen2" 117, respectively. The simulation unit 101 can then run simulations on each of the simulation decks to determine behavior of the electrical design 103 for each test case. Then, the simulation unit 101 can store the output of each simulation in a log file. After output has been collected for each test case, the simulation unit 101 can search the log file for the potential best and worst cases based on measurements taken during the simulations. Different numbers of potential best and worst cases can be determined based on preferences/configurations. The potential best cases are based on parameters of the electrical design that can be controlled by a designer. Examples of parameters that can be controlled by the designer include length of transmission lines, spacing between transmission lines, driver strengths, etc. The potential worst cases are based on parameters of the electrical design that cannot be controlled by a designer due to variances in manufacturing or other external factors. Examples of parameters that cannot be controlled by the designer include impedance of transmission lines, temperature, power supply voltage, power supply noise, etc.

At stage D, the simulation unit 101 initializes a simulation module 127 that implements a type of swarm intelligence algorithm (e.g., a particle swarm optimization algorithm, an ant colony optimization algorithm, etc.). The simulation unit 101 seeds or primes the simulation module 127 with the initial population of potential best and worst design cases derived from the statistical analysis by the statistical analysis design module 123. A group of simulation agents implemented by the simulation module 127 move through a design space represented by the initial population of best and worst design cases. The simulation module 127 determines an overall best and an overall worst case. Each of the simulation agents can be aware of a personal best/worst case and a collective best/worst case for the group of simulation agents. The simulation agents use the personal and collective best/worst cases to compute paths for travelling through the design space. The simulation agents' paths are initialized based on the potential best/worst cases such that each of the potential best/worst cases corresponds to one of the simulation agent's personal best/worst case. If a simulation agent that is searching for an overall best case determines that a step along a path produces a result worse than the simulation agent's personal best, the simulation agent abandons that path and computes a new path until the design space has been traversed or all paths have been exhausted. If the simulation agent encounters a result that is better than the collective best, the simulation agent updates the collective best based on its personal best.

At stage E, the simulation unit 101 determines one best and one worst case based on output of the simulation module 127. The simulation unit 101 can determine the best and the worst case based on the collective best and worst cases determined by the simulation module 127. The best case are based on parameters in the electrical design 103 that can be controlled by a designer and the worst case are based on parameters in the electrical design 103 that cannot be controlled by the designer. The simulation unit 101 determines if the design meets specifications by applying the best case to parameters that can be controlled and the worst case to parameters that cannot be controlled in the electrical design 103 and running a simulation. If the design does not meet specifications, the simulation unit 101 can perform a sensitivity analysis of the best case with respect to the worst case to determine which of the parameters is most sensitive to variations and the probability of failure due to variation. The simulation unit 101 can generate a representation (e.g., display a graphical depiction, store/transmit a data file, etc.) of a recommended/proposed best design that satisfies specifications. Embodiments can also generate a recommended/proposed best design representation with indications of aspects of the best design that fail to satisfy the specifications and/or a recommended/proposed alternative best design(s) that satisfies the specifications.

Figure 2:
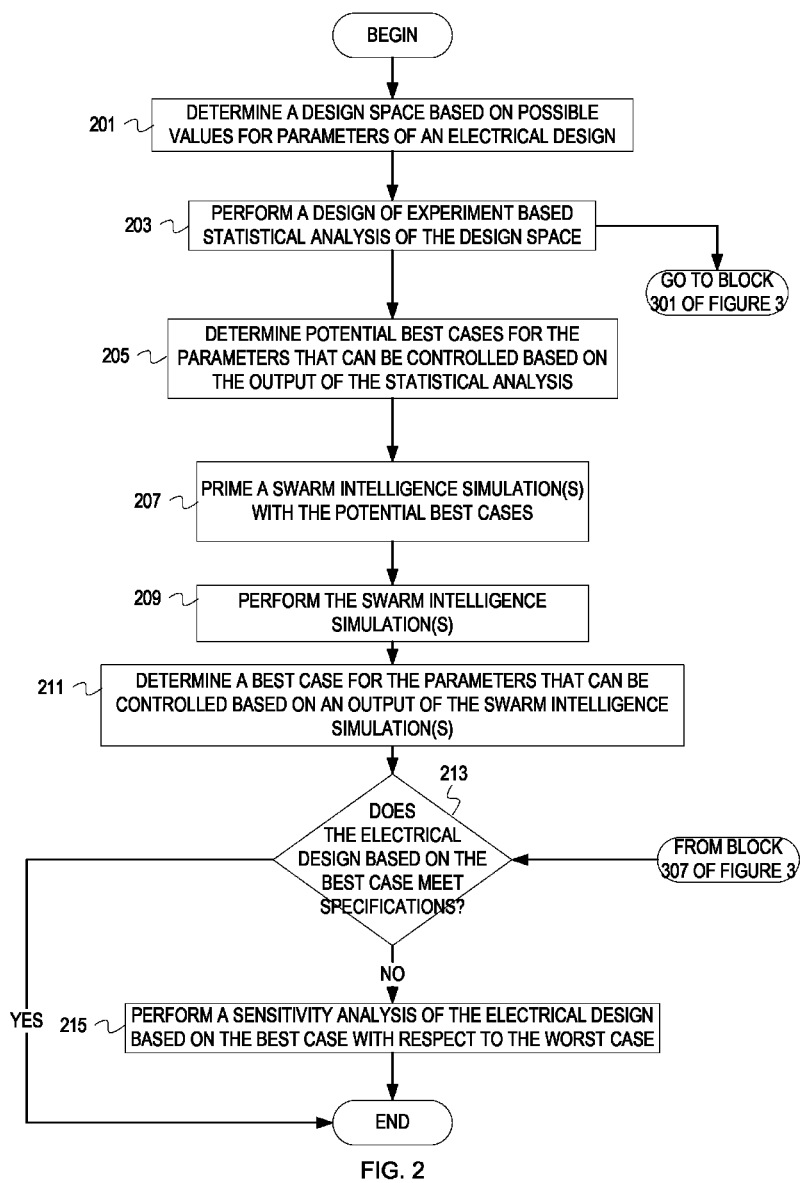
FIGS. 2-3 are flowcharts depicting example operations for priming a swarm intelligence based simulation with worst and best cases based on a statistical analysis of a design space.
Figure 3:
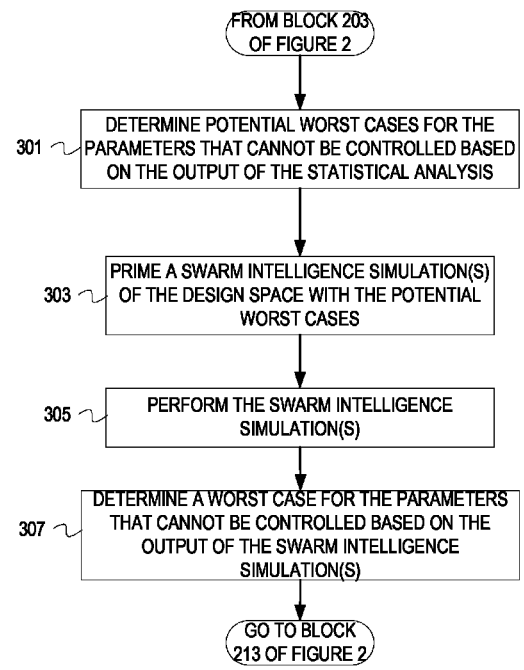

FIGS. 2-3 are flowcharts depicting example operations for priming a swarm intelligence based simulation with worst and best cases based on a statistical analysis of a design space. Flow begins at block 201 where a design space is determined based on potential values that can be applied to parameters of an electrical design. The design space comprises a set of potential values for each of the parameters in the electrical design. Examples of parameters include driver strength, driver rise/fall times, transmission line lengths, transmission line impedances, temperature, power supply voltages, etc. The design space can be determined based on input of a designer. For example, the designer can create a file that defines the design space and provide the file to a simulation unit as input when analysis of the electrical design is requested.

At block 203, a design of experiment based statistical analysis is performed on the design space. The statistical analysis can explore the design space by determining test cases based upon a design of experiment technique. The test cases comprise variations of the possible values in the design space that can applied to the parameters of the electrical design. Example design of experiment techniques include CCD, Taguchi methods, etc. Simulations can be run for each test case and the results of the simulation can be stored in a log file.

After the statistical analysis, the flow splits for best and worst design cases. Processing of the potential best design cases continues at block 205. Processing of the potential worst design cases continues at block 301 of FIG. 3. At block 205, potential best cases based on the parameters that can be controlled are determined based on output of statistical analysis. The potential best cases can comprise sets of parameter values that yielded favorable simulation results. For example, the potential best cases can be determined based on a log file containing simulation results of test cases from the statistical analysis. The potential best cases can be determined based on thresholds for measurements taken during the simulations. For example, amplitude, rise and fall times of an output signal may have been measured during the simulations. The potential best cases can be determined based on the amplitude, rise and fall time measurements falling within particular ranges. The potential best cases and the potential worst cases can be determined in accordance with any one of heuristics, thresholds, predefined criteria, etc.

At block 207, a swarm intelligence simulation(s) is primed with the potential best cases. Personal bests of a group of simulation agents can be initialized based on the potential best cases. A collective best for the group can be initialized based on a best of the potential best cases. The simulation agents are aware of the parameter values associated with their respective personal bests and the results of the previous simulations. The goal of the simulation agents is to vary the parameter values to locate parameter values that yield better simulation results than the simulation agents' personal bests.

At block 209, the swarm intelligence simulation(s) is performed. Each of the simulation agents can compute paths to traverse the design space based on the simulation agent's personal best and the collective best. For example, a simulation agent can compute a new set of parameter values based on parameter values of the simulation agent's personal best and the collective best. A simulation can be performed to determine if the parameter values yield a result better than the simulation agent's personal best and the collective best. If the simulation agent encounters a result better that the simulation agent's personal best, the simulation agent updates the simulation agent's personal best and continues along the path. If the simulation agent encounters a result that is worse than the simulation agent's personal best, the simulation agent abandons that path and computes a new path. If a simulation agent encounters a personal best that is better than the collective best, the simulation agent updates the collective best to the simulation agent's personal best. When a simulation agent encounters a result that is worse than the simulation agent's personal best, the simulation agent abandons a current path and computes a new path. The swarm intelligence simulation (s) can finish when all paths are exhausted.

At block 211, a best case for the parameters that can be controlled is determined based on an output of the swarm intelligence simulation(s). The best case can be determined based on the collective best of the swarm intelligence simulation(s). Control flows from block 211 to block 213.

FIG. 3 depicts operations that continue from FIG. 2 for potential worst cases determined from the design of experiment based statistical analysis. Flow continues from block 203 of FIG. 2 at block 301, where potential worst cases for the parameters that cannot be controlled are determined based on output of the statistical analysis. The potential worst cases can comprise sets of parameter values that yielded unfavorable simulation results. For example, the potential worst cases can be determined based on a log file containing simulation results of test cases from the statistical analysis.

At block 303, swarm intelligence simulation(s) is primed with the potential worst cases. Personal worsts of a group of simulation agents can be initialized based on the potential worst cases. A collective worst for the group can be initialized based on a worst of the potential worst cases. The simulation agents are aware of the parameter values associated with their respective personal worsts and the results of the simulations from the statistical analysis. The goal of the simulation agents is to vary the parameter values to locate parameter values that yield worse simulation results than the simulation agents' personal worsts.

At block 305, the swarm intelligence simulation(s) is performed. Each of the simulation agents can compute paths to traverse the design space based on the simulation agent's personal worst and the collective worst. For example, a simulation agent can compute a new set of parameter values based on parameter values of the simulation agent's personal worst and the collective worst. A simulation can be performed to determine if the parameter values yield a result worse than the simulation agent's personal worst and the collective worst. If the simulation agent encounters a result worse that the simulation agent's personal worst, the simulation agent updates the simulation agent's personal worst and continues along the path. If the simulation agent encounters a result that is better than the simulation agent's personal worst, the simulation agent abandons that path and computes a new path. If a simulation agent encounters a personal worst that is worse than the collective worst, the simulation agent updates the collective worst to the simulation agent's personal worst. When a simulation agent encounters a result that is better than the collective best, the simulation agent updates the collective best and abandons a current path and computes a new path. The swarm intelligence simulation(s) can finish when all paths are exhausted.

At block 307, a worst case for the parameters that cannot be controlled is determined based on an output of the swarm intelligence simulation(s). The worst case can be determined based on the collective worst of the swarm intelligence simulation(s). Flow continues to block 213 of FIG. 2.

Returning to FIG. 2, the best case has been determined in block 211 and a worst case has been determined in block 307 of FIG. 3. Flow continues at block 213, where it is determined if an electrical design based on the best case meets specifications. Parameters that can be controlled in the electrical design can be set based on parameter values of the best case, while parameters that cannot be controlled in the electrical design can be set based on parameter values of the worst case. A simulation of the electrical design can then be run and results can be saved in a log file. The log file can be examined to determine if the electrical design meets the specifications. If the electrical design meets specifications, flow ends. If the design does not meet specifications, flow continues at block 215.

At block 215, a sensitivity analysis of the electrical design can be performed based on the best case with respect to the worst case. The sensitivity analysis can determine which of the parameters that cannot be controlled has the most impact on the failure of the design. The sensitivity analysis can also determine the probability of the worst case being realized in the parameters that cannot be controlled. If the probability of the worst case being realized is low, the electrical design may be implemented even though the electrical design does not meet specifications at the worst case.

Embodiments are not limited to the example flowcharts depicted in the above figures. Embodiments can perform additional operations, fewer operations, operations in parallel, etc. For instance, referring to FIGS. 2 and 3, operations for processing the potential best and worst cases from the design of experiment based statistical analysis can be executed in parallel.

This hybrid of statistical analysis and swarm intelligence leverages the global aspects and simulation speed of statistical analysis with the local space and non-linear aspects of swarm intelligence. Seeding a swarm intelligence simulation with potential worst and best cases determined from statistical analysis reduces time-to-solution and number of simulations.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
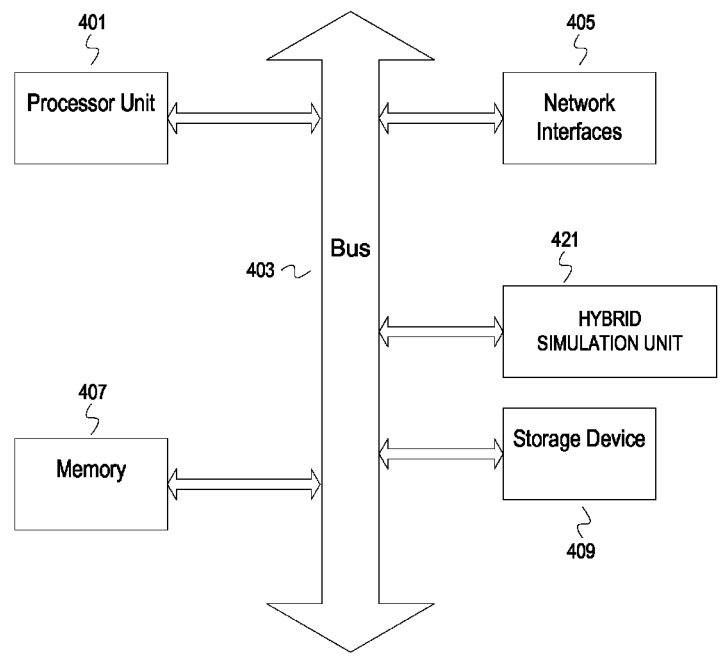
FIG. 4 depicts an example computer system.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system also includes a simulation unit 421. The simulation unit 421 can initialize a population for SI based on best and worst cases determined by performing a statistical analysis of a design space. The simulation unit 421 determines an overall best and an overall worst case based on output of the SI. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
performing a design of experiment based statistical analysis on a design space defined by a plurality of values for a plurality of parameters;
generating a plurality of potential best and worst cases for a design based, at least in part, on said performing the design of experiment based statistical analysis on the design space defined by the plurality of values for the plurality of parameters;
seeding a population of a swarm intelligence based simulation of the design with the plurality of potential best and worst cases for the design,
wherein said seeding the population of the swarm intelligence based simulation of the design with the plurality of potential best and worst cases for the design comprises,
setting personal bests of each of a first plurality of simulation agents to one of the plurality of potential best cases;
setting a collective best for the first plurality of simulation agents to a best of the plurality of potential best cases;
setting personal worsts of each of a second plurality of simulation agents to one of the plurality of potential worst cases; and
setting a collective worst for the second plurality of simulation agents to a worst of the plurality of potential worst cases, wherein the swarm intelligence based simulation employs the first and the second plurality of simulation agents; and
generating an overall best case of the design and an overall worst case of the design based, at least in part, on an output of the swarm intelligence simulation.

2. The method of claim 1, wherein the plurality of potential best cases are based on parameters that can be controlled by a designer and the plurality of potential worst cases are based on parameters that cannot be controlled by the designer, wherein the parameters represent physical characteristics of the design.

3. The method of claim 1, wherein said generating the plurality of potential best and worst cases for the design comprises:
determining a set of test cases to simulate based on the design space;
running simulations on each of the set of test cases;
storing results of the simulations; and
searching the results for the plurality of test cases that satisfy best case design criteria and worst case design criteria.

4. The method of claim 1, wherein said generating the overall best case of the design and the overall worst case of the design based, at least in part, on an output of the swarm intelligence simulation comprises determining the overall best case based upon an output collective best from the swarm intelligence simulation and determining the overall worst case based upon an output collective worst from the swarm intelligence simulation.

5. The method of claim 1 further comprising:
determining that a candidate design based on the overall best case does not meet specifications; and
performing a sensitivity analysis on the candidate design in accordance with the specifications.

6. The method of claim 5, wherein said determining that the candidate design based on the overall best case does not meet specifications comprises:
setting parameters of the design that can be controlled by the designer to values of the overall best case;
setting parameters of the design that cannot be controlled by the designer to values of the overall worst case; and
simulating the design with the set values.

7. A computer program product for design space search, the computer program product comprising:

a non-transitory computer readable storage medium having computer readable program code embodied therewith, the computer readable program code comprising:
computer readable program code configured to,
perform a design of experiment based statistical analysis on a design space defined by a plurality of values for a plurality of parameters;
generate a plurality of potential best and worst cases for a design based, at least in part, on performing the design of experiment based statistical analysis on the design space defined by the plurality of values for the plurality of parameters;
seed a population of a swarm intelligence based simulation of the design with the plurality of potential best and worst cases for the design, wherein the computer readable program code being configured to seed the population of the swarm intelligence based simulation of the design with the plurality of potential best and worst cases for the design comprises the computer readable program code being configured to,
set personal bests of each of a first plurality of simulation agents to one of the plurality of potential best cases;
set a collective best for the first plurality of simulation agents to a best of the plurality of potential best cases;
set personal worsts of each of a second plurality of simulation agents to one of the plurality of potential worst cases; and
set a collective worst for the second plurality of simulation agents to a worst of the plurality of potential worst cases, wherein the swarm intelligence based simulation employs the first and the second plurality of simulation agents; and
generate an overall best case of the design and an overall worst case of the design based, at least in part, on an output of the swarm intelligence simulation.

8. The computer program product of claim 7, wherein the computer readable program code being configured to perform the design of experiment based statistical analysis on the design space defined by the plurality of values for the plurality of parameters comprises the computer readable program code being configured to:
determine a set of test cases to simulate based on the design space;
run simulations on each of the set of test cases;
store results of the simulations; and
search the results for the plurality of test cases that represent the plurality of potential best and worst cases.

9. The computer program product of claim 7, wherein the computer readable program code being configured to generate the overall best case of the design and the overall worst case of the design based, at least in part, on the output of the swarm intelligence simulation comprises the computer readable program code being configured to determine the overall best case based upon an output collective best from the swarm intelligence simulation and to determine the overall worst case based upon an output collective worst from the swarm intelligence simulation.

10. The computer program product of claim 7, wherein the computer readable program code is further configured to:
determine that a candidate design based on the overall best case does not meet specifications; and
perform a sensitivity analysis on the candidate design in accordance with the specifications.

11. The computer program product of claim 10, wherein the computer readable program code being configured to determine that the candidate design based on the overall best case does not meet specifications comprises the computer readable program code being configured to:
set parameters of the design that can be controlled by the designer to values of the overall best case;
set parameters of the design that cannot be controlled by the designer to values of the overall worst case; and
simulate the design with the set values.

12. A computer program product for optimizing design space search efficiency, the computer program product comprising:
a non-transitory computer readable storage medium having computer readable program code embodied therewith, the computer readable program code comprising:
computer readable program code configured to,
prime a swarm intelligence based simulation with output from a design of experiment based statistical analysis performed with a plurality of values for a plurality of parameters that define a space for a design; and
generate a representation of a recommended design based, at least in part, on a set of the plurality of values determined by the swarm intelligence simulation, wherein the computer readable program code being configured to generate the representation of the recommended design based, at least in part, on the set of the plurality of values determined by the swarm intelligence simulation comprises the computer readable program code being configured to,
set the plurality of best cases as bests of a first plurality of simulation agents;
set a collective best for the first plurality of simulation agents to a best of the plurality of best cases;
set the plurality of worsts as personal worsts of a second plurality of simulation agents; and
set a collective worst for the second plurality of simulation agents to a worst of the plurality of worst cases, wherein the swarm intelligence based simulation employs the first and the second plurality of simulation agents to search the space.

13. The computer program product of claim 12, wherein the computer readable program code being configured to prime the swarm intelligence based simulation with output from the design of experiment based statistical analysis performed with the plurality of values for the plurality of parameters that define the space for the design comprises computer readable program code being configured to:
determine a plurality of best cases and a plurality of worst cases for the design with the output of the design of experiment based statistical analysis; and
supply the plurality of best cases and the plurality of worst cases as input to the swarm intelligence based simulation.

14. An apparatus comprising:
a process unit;
a network interface; and
a simulation unit operable to,
perform a design of experiment based statistical analysis on a design space defined by a plurality of values for a plurality of parameters;
generate a plurality of potential best and worst cases for a design based, at least in part, on performing the design of experiment based statistical analysis on the design space defined by the plurality of values for the plurality of parameters;
seed a population of a swarm intelligence based simulation of the design with the plurality of potential best and worst cases for the design, wherein the simulation unit being operable to seed the population of the swarm intelligence based simulation of the design with the plurality of potential best and worst cases for the design comprises the simulation unit being operable to, set personal bests of each of a first plurality of simulation agents to one of the plurality of potential best cases;

set a collective best for the first plurality of simulation agents to a best of the plurality of potential best cases;

set personal worsts of each of a second plurality of simulation agents to one of the plurality of potential worst cases; and set a collective worst for the second plurality of simulation agents to a worst of the plurality of potential worst cases, wherein the swarm intelligence based simulation employs the first and the second plurality of simulation agents; and generate an overall best case of the design and an overall worst case of the design based, at least in part, on an output of the swarm intelligence simulation.

15. The apparatus of claim 14, wherein the simulation unit being operable to perform the design of experiment based statistical analysis on the design space defined by the plurality of values for the plurality of parameters comprises the simulation unit being operable to:

determine a set of test cases to simulate based on the design space;

run simulations on each of the set of test cases;

store results of the simulations; and search the results for the plurality of test cases that represent the plurality of potential best and worst cases.

16. The apparatus of claim 14, wherein the simulation unit is further operable to:

determine that a candidate design based on the overall best case does not meet specifications; and perform a sensitivity analysis on the candidate design in accordance with the specifications.

17. The apparatus of claim 16, wherein the simulation unit being operable to determine that the candidate design based on the overall best case does not meet specifications comprises the simulation unit being operable to:

set parameters of the design that can be controlled by the designer to values of the overall best case;

set parameters of the design that cannot be controlled by the designer to values of the overall worst case; and simulate the design with the set values.

* * * * *